United States Patent
Liu et al.

(10) Patent No.: US 8,416,354 B2
(45) Date of Patent: Apr. 9, 2013

(54) DISPLAY APPARATUS WITH DISPLAY SWITCHING MODES

(75) Inventors: Sheng-Chi Liu, Xindian (TW); Cheng-Chung Hu, Taoyuan (TW)

(73) Assignee: Chunghwa Picture Tubes, Ltd., Taoyuan County (TW)

( * ) Notice: Subject to any disclaimer, the term of this patent is extended or adjusted under 35 U.S.C. 154(b) by 198 days.

(21) Appl. No.: 12/851,781

(22) Filed: Aug. 6, 2010

(65) Prior Publication Data

US 2011/0285953 A1 Nov. 24, 2011

(30) Foreign Application Priority Data

May 21, 2010 (TW) .............................. 99209677 U

(51) Int. Cl.
*G02F 1/1335* (2006.01)
*G02F 1/1343* (2006.01)

(52) U.S. Cl. .......................................... 349/15; 349/141

(58) Field of Classification Search .................... 349/15, 349/141, 74; 348/51, 54, 58–59
See application file for complete search history.

(56) References Cited

U.S. PATENT DOCUMENTS

| 6,137,456 | A  | * | 10/2000 | Bhagavatula et al. | 345/7 |
| 7,511,774 | B2 | * | 3/2009  | Lee et al. | 349/15 |
| 7,986,283 | B2 | * | 7/2011  | Park et al. | 345/32 |
| 8,174,464 | B2 | * | 5/2012  | Choi et al. | 345/6 |
| 2007/0046564 | A1 | * | 3/2007 | Kim et al. | 345/6 |
| 2007/0070282 | A1 | * | 3/2007 | Shibahara et al. | 349/141 |
| 2008/0218459 | A1 | * | 9/2008 | Kim et al. | 345/87 |
| 2009/0122210 | A1 | * | 5/2009 | Im | 349/15 |

* cited by examiner

*Primary Examiner* — Edward Glick
*Assistant Examiner* — Dennis Y. Kim
(74) *Attorney, Agent, or Firm* — Ming Chow; Sinorica, LLC

(57) ABSTRACT

The present invention discloses a display apparatus with display switching modes, the display apparatus includes a display device; an image mode switch device formed corresponding to the display device, wherein the image mode switch device includes: a liquid crystal layer; a first electrode set on a side of the liquid crystal layer; a second electrode set between the first electrode and the liquid crystal layer; a third electrode set on another side of the liquid crystal layer; and a voltage providing device electrically coupled to the image mode switch device to supply different voltage to the first electrode, the second electrode and the third electrode for switching displaying mode; the display apparatus may display the 2D, 3D and IP stereo image by using the electrodes with different pattern and voltage on the first electrode, the second electrode and the third electrode.

12 Claims, 5 Drawing Sheets

DISPLAY APPARATUS WITH DISPLAY SWITCHING MODES

FIELD OF THE INVENTION

The present invention relates to a three-dimensional (3D) display apparatus, and more particularly, to a display apparatus for switching the display modes among two-dimensional (2D) images, three-dimensional (3D) images and Integral Photography (IP) images by altering the electrical field distribution to change the optical property of the liquid crystal lens.

BACKGROUND OF THE INVENTION

Typically, the three dimensional images are created through the user's eye by the stereo image theory. Namely, when the eyes are separated with 5-7 cm, the images caught by the two eyes are slightly distinguishable, and it leads to the result of visual difference. Thus, the traditional three-dimensional image is obtained by the visual difference effect so as to allow the left eye to only receive the left-eye image while the right eye only receives the right-eye image.

Typically, the visual difference based three-dimensional image needs a special design equipment to achieve the goal, and the typical methods are introduced as follows.

The first type introduces the polarized glasses which includes a horizontally polarized glass and a vertically polarized glass for each eye to allow the left eye to receive the horizontally polarized image and the right eye to receive the vertically polarized image. The display apparatus may radiate the horizontally polarized left-eye image and the vertically polarized right-eye image, respectively. By the method, the left eye of the user may receive the horizontally polarized left-eye image while the right eye of the user may receive the vertically polarized right-eye image, and thereby creating the three-dimensional image. However, when the head of the user slightly inclines, the light in the other orientation of polarization will be not completely filtered by the polarized glasses. It will cause the user to be uncomfortable.

The second type involves the usage of red-blue (green) glasses. The technique introduces the displaying of the left, and the right images by using the red-blue (green) glasses to allow the user to receive the left and the right images by each eye, respectively, and thereby creating the three-dimensional image after receiving the left and the right images through the red-blue (green) glasses. However, the shortcoming of the type of the three-dimensional image displaying is that the true color of the original image cannot be re-built by using the red-blue (green) glasses. The third type of the prior art involves the usage of the shutter glasses. The image displaying apparatus will transmit odd images and even images to the shutter glasses, respectively. If the odd images are set to act the right-eye images while the odd images are defined as the left-eye images, then the odd images are transmitted, and the left eye will be covered by the shutter glasses. Similarly, when the even images are transmitted, the right eye will be covered by the shutter glasses so as to allow the user to watch the three-dimensional image. The fourth type is called helmet type image display which has two liquid crystal displays on the glasses directly, and the user receives the left and the right eye images through the two displays by the left and the right eyes, respectively. This type is better than the first type and the second type. However, the cost of the manufacture is high, and the number of the users to watch the images is limited.

No matter the cost of the manufacture of those prior arts is, for all of the prior arts mentioned above, the glasses is required for the user to wear on for watching three-dimensional image. It is inconvenient to the user at all. Thus, the recent development is mainly focusing on the glasses-free three-dimensional image display apparatus.

One of the types which involves the glasses-free three-dimensional image display apparatus is called visual-difference bare-eye three-dimensional image display apparatus which is designed based on the visual difference phenomena. Under the scheme of the visual-difference bare-eye design, a parallax or an optical grating is set before the liquid crystal display. The left-eye image and the right-eye image are transmitted in sequence. The parallax functions to allow the right-eye and the left-eye to receive the right-eye and the left-eye images, respectively. The signals of the right-eye and the left-eye images will be re-constructed by the brain of the user, and thereby achieving the three-dimensional image.

In addition to the above glasses-free three-dimensional image display apparatus, a further glasses-free three-dimensional image technique involves Integral Photography (IP) technology which has developed since 1908. The major working principle of the IP is using the fly's eye lens to catch the stereo images from different angle. The fly's eye lens simulates the arrangement of the eye of the fly to arrange pluralities of tiny lens in an array configuration. Namely, pluralities of semi-sphere lens are arranged within a planar in an array for facilitating catching image. The Integral Photography (IP) technology involves two major steps, and the first one may refer to FIG. 1A, wherein an image capture device 105 catches the stereo image 107 from different angle of the object 101 by the fly's eye lens 103. Thereafter, referring to FIG. 1B, the next step is to process the captured images through the display apparatus 109 and the fly eye lens 103 to re-built the three-dimensional stereo image 110 of the object.

From above mentioned, the parallax or optical grating is required within the display apparatus as using the visual difference three-dimensional image technique. A fly's eye lens is required within the display apparatus to show the three-dimensional image as using the IP three-dimensional image technique. When the user uses specified display apparatus for display the three-dimensional image generated by specified method, the usage will be limited by the specified display apparatus. If data of the captured images is not compatible to the hardware, then the three-dimensional image cannot be displayed at all.

SUMMARY OF THE INVENTION

To solve the aforementioned problems of the conventional techniques, the present invention provides a display apparatus with display switching modes for displaying 2D, different type of 3D image information by employing one apparatus.

One advantage of the present invention is to offer a display apparatus for switching among the 2D, 3D, and IP stereo image.

In one aspect of the present invention, a display apparatus with display switching modes is disclosed, and it comprises a display device; an image mode switch device formed corresponding to the display device, wherein the image mode switch device includes: a liquid crystal layer; a first electrode set on a side of the liquid crystal layer; a second electrode set between the first electrode and the liquid crystal layer; a third electrode set on another side of the liquid crystal layer; and a voltage providing device electrically coupled to the image mode switch device to supply different voltage to the first electrode, the second electrode and the third electrode for switching displaying modes; the display apparatus may display the 2D, 3D and IP stereo image by using the electrodes with different pattern and voltage on the first electrode, the second electrode and the third electrode.

In another aspect of the present invention, a display apparatus with display switching modes is disclosed, and it comprises a display device; an image mode switch device formed corresponding to the display device, wherein the image mode switch device includes: a liquid crystal layer; a first electrode set on a side of the liquid crystal layer; a second electrode set between the first electrode and the liquid crystal layer; a third electrode set on another side of the liquid crystal layer; and a voltage providing device electrically coupled to the image mode switch device to supply different voltage to the first electrode, the second electrode and the third electrode for switching displaying mode; wherein the first electrode includes a first pattern, the second electrode including a second pattern having a first portion and a second portion, wherein the first portion and the second portion have different pattern spacings and are constructed by an interdigitated configuration.

The first electrode is constructed by a square frame with pluralities of horizontal lines formed therein; the second electrode includes a first portion and a second portion. The first portion and the second portion are formed by pluralities of vertical lines which are connected by a horizontal line. Additionally, the vertical lines of the first portion and the second portion are formed in parallel; both horizontal lines are set on sides which are in opposition with each other. The second electrode and the third electrode are grounded when the display apparatus displays two-dimensional image. The first electrode is grounded, the second electrode and the third electrode is supplied with a first voltage when the display apparatus displays three-dimensional image. The first electrode and the third electrode are supplied with a second voltage, and the second portion of the second electrode and the third electrode are supplied with a third voltage, the first portion of the second electrode being grounded when the display apparatus displays a stereo image.

A display apparatus with display switching modes comprises a display device; an image mode switch device formed corresponding to the display device, wherein the image mode switch device includes: a liquid crystal layer; a first electrode set on a side of the liquid crystal layer; a second electrode set between the first electrode and the liquid crystal layer; a third electrode set on another side of the liquid crystal layer; and a voltage providing device electrically coupled to the image mode switch device to supply different voltage to the first electrode, the second electrode and the third electrode for switching displaying mode; wherein the first electrode includes a first pattern, the first pattern being constructed by a grid pattern with pluralities of square frames; the second electrode includes a second pattern constructing by pluralities of titled lines. The square frame is formed with 1×1 to 500× 500 pixels.

The first electrode, the second electrode and the third electrode are grounded when the display apparatus displays two-dimensional image. The first electrode is grounded, and the second electrode and the third electrode are supplied with a first voltage when the display apparatus displays three-dimensional image. The first electrode and the third electrode are supplied with a second voltage, and the third electrode is grounded when the display apparatus displays a stereo image.

These and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below. The identical reference numbers in the drawings refer to the same components in the present invention. However, it should be appreciated that all the preferred embodiments of the invention are only for illustrating but not for limiting the scope of the Claims and wherein:

DETAILED DESCRIPTION OF THE PREFERRED EMBODIMENT

The invention will now be described with the preferred embodiments and aspects and these descriptions interpret structure and procedures of the invention only for illustrating but not for limiting the Claims of the invention. Therefore, except the preferred embodiments in the specification, the present invention may also be widely used in other embodiments.

The present invention discloses a display apparatus which may be switched among the two-dimensional, three-dimensional and IP stereo image so as to allow the user to fetch the image information according to the image type by switching the electrode pattern with specified voltage to alter the display modes, and thereby displaying the image of two-dimensional, three-dimensional or IP stereo image. The stereo image mentioned in the present invention refers to the image created by visual difference bare-eye three-dimensional technology and the method thereof.

It is because that the arrangement and distribution of the liquid crystal molecular will be altered based on the electrical field distribution, and therefore, the twisted angle of the liquid crystal is not the same under different electrical field distribution caused by the electrode pattern with different supplied voltage. Consequently, the optical property such as the focal length of the liquid crystal lens will be change in order to achieve the optical effect of convex lens, concave lens, fly-eye lens or parallax. Thus, the present invention employs the different electrode pattern to cause the electrical field distribution to be changed, and thereby driving the liquid crystal lens to allow the display apparatus to display the image of two-dimensional, three-dimensional or IP stereo image according to the type of the display image.

Figure 1A:
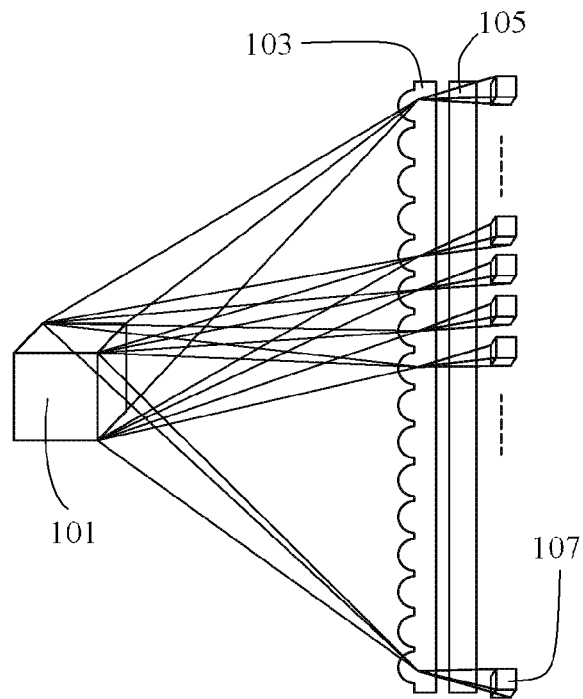
FIGS. 1A-1B illustrate a method of fetching and displaying IP stereo image technology of the prior art.
Figure 1B:
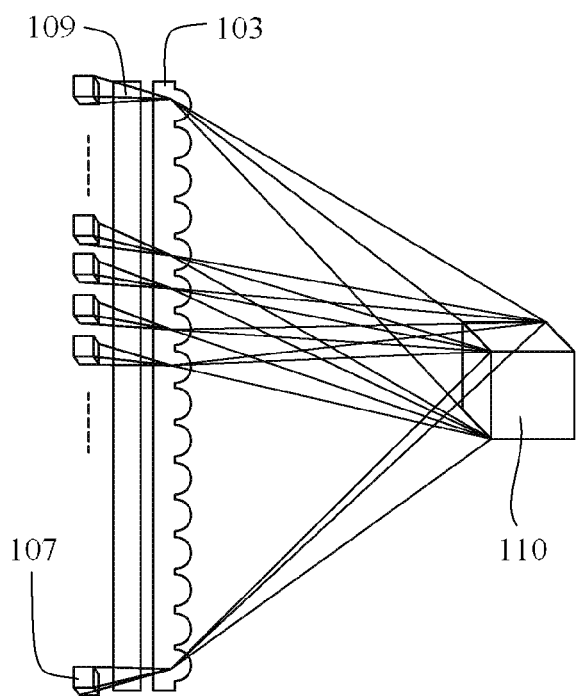
Figure 2A:
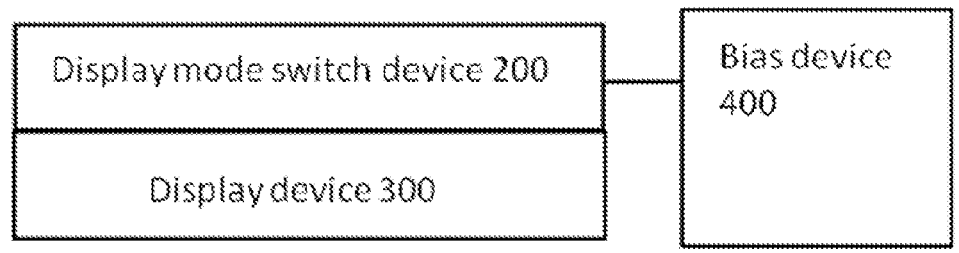
FIGS. 2A-2C illustrate a display apparatus with the ability of switching among 2D, 3D, and IP stereo image with one embodiment of the present invention.
Figure 2B:
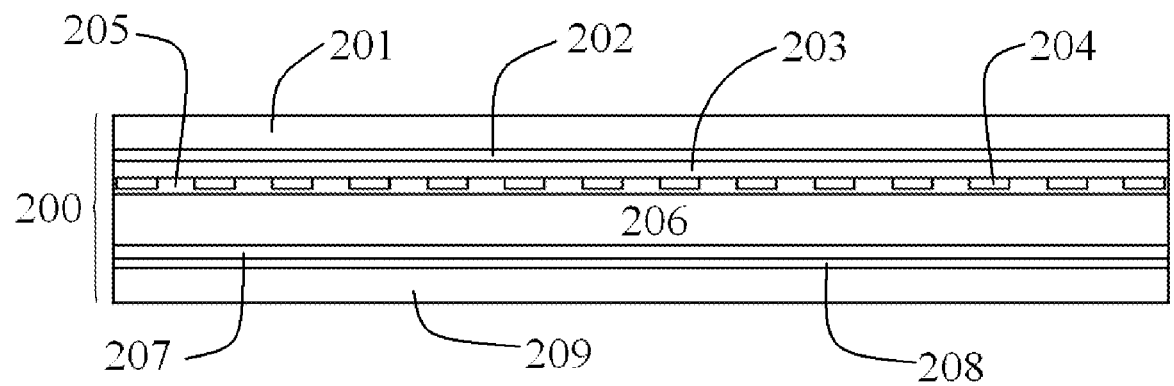
Figure 2C:
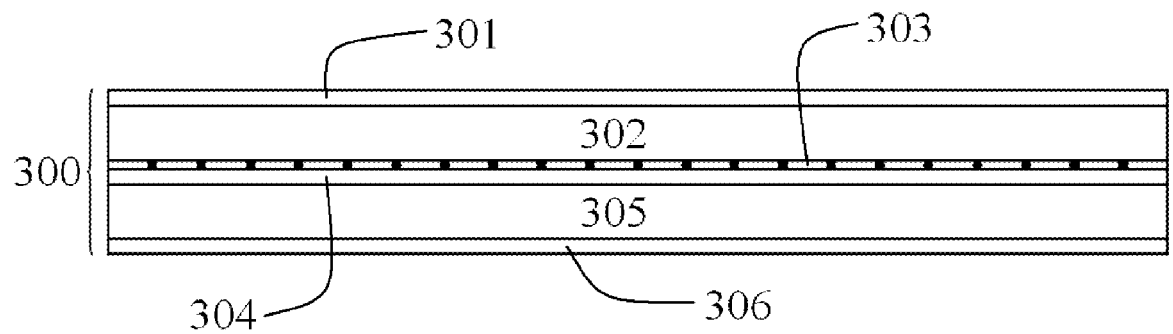

Referring to FIGS. 2A-2C, they show the display apparatus having the modes to switch among two-dimensional, three-dimensional and IP stereo image. The apparatus includes an image mode switch device 200, a display device 300 and a voltage providing device 400. The image mode switch device 200 is responsive to the display device 300 to display different images and switch the modes by the voltage providing device 400 to show the effect of two-dimensional, three-dimensional or IP stereo image.

Next, referring to FIG. 2B, it illustrates the structure of the image mode switch device 200 which includes a first glass substrate 201, a first electrode 202, an isolation layer 203, a second electrode 204, a first alignment layer 205, a first liquid crystal layer 206, a second alignment layer 207, a third electrode 208 and a second glass substrate 209. The first electrode 202 is disposed adjacent to one side of the first liquid crystal layer 206, and the second electrode 204 is formed between the first electrode 202 and the first liquid crystal layer 206. The third electrode 208 is set on another side of the first liquid crystal layer 206.

The present invention offers different electrode pattern and provides different voltage to the first electrode 202, the second electrode 204 and the third electrode 208 so as to cause the liquid crystal molecular in the liquid crystal layer 206 to be affected by different electrode field distribution, and thereby changing the arrangement of the liquid crystal molecular, which leads to the change of optical property. The illustration of switching among the two-dimensional, three-dimensional and IP stereo image is described as follows.

In one embodiment, the display apparatus may be the liquid crystal display. Turning to FIG. 2C, it illustrates structure of the liquid crystal display 300 which includes a first polarizer 301, a third glass substrate 302, a color layer 303, a second liquid crystal layer 304, a fourth glass substrate 305, and a second polarizer 306. In one embodiment, the image display switching modes is set based on the liquid crystal display 300 to switch among two-dimensional, three-dimensional and IP stereo image according to different image information. Here, the liquid crystal display panel is only for illustrated, and therefore the detailed structure is omitted, which is well-known by the person having ordinary skill in the art. It should be noted that the present invention uses the liquid crystal panel as an example, and the other type of display can also be implemented in the present invention, wherein the display includes but not limited to an organic light emitting display (OLED), a plasma display panel (PDP), or a field emission display (FED).

In some embodiments of the present invention, the first electrode 202, the second electrode 204 and the third electrode 208 are formed by the material with high transmittance and high conductivity, for instance, including but not limited to Indium Tin Oxide (ITO), Indium Zinc Oxide (IZO). In a preferred embodiment, the first electrode 202, the second electrode 204 and the third electrode 208 are formed by ITO. In some embodiments of the present invention, the first alignment layer 205 and the second alignment layer 207 are Polyimide (PI).

Referring to FIG. 2A again, the image mode switch device 200 is electrically coupled to the voltage providing device 400. Preferably, the image mode switch device 200 is electrically coupled to the first electrode 202, the second electrode 204 and the third electrode 208, to offer the different voltage to the first electrode 202, the second electrode 204 and the third electrode 208. In some embodiments, the voltage providing device 400 is also electrically coupled to the display device 300 so as to offer voltage to the image mode switch device 200 and the display device 300. In another embodiment, the voltage providing device 400 can be set in the display device 300 to allow the display device 300 to control the action and operation of the image mode switch device 200.

Figure 3A:
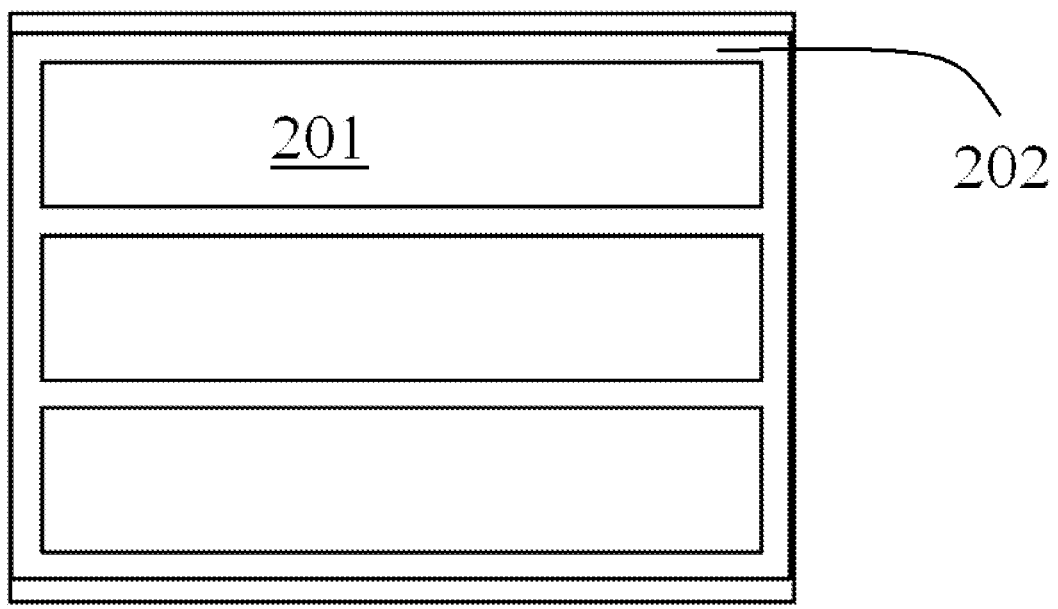
FIGS. 3A-3B illustrate the first and the second electrode with one embodiment of the present invention.
Figure 3B:
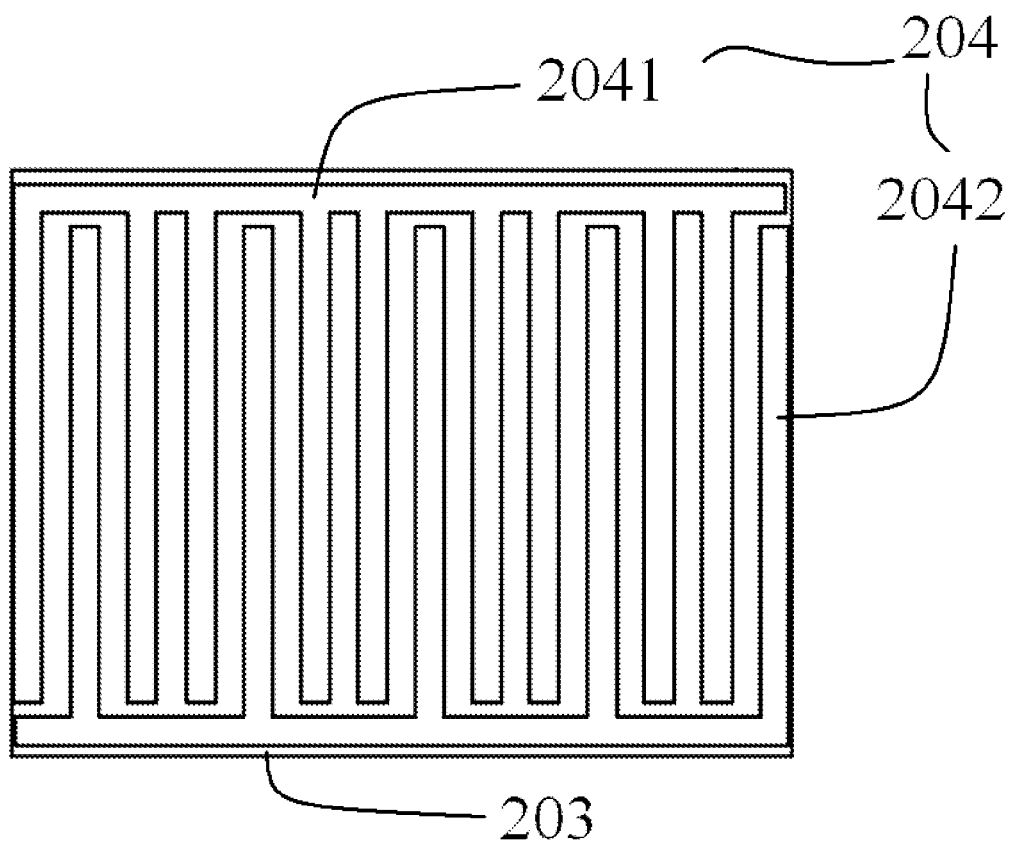

FIG. 3A illustrates the structure of the first electrode 202. The ITO is formed on one side of the first glass substrate 201 to make the first electrode 202 with rectangular frame and pluralities horizontal lines patterns in the middle region. The manufacturing process includes a step of forming the first electrode 202 on the first glass substrate 201. The isolation layer 203 is subsequently formed on the other side of the glass substrate 201 opposite to the first electrode 202, and followed by forming the second electrode 204 thereon. The step may be altered to achieve the same result. Please refer to FIG. 3B, it shows the second electrode 204 structure. The second electrode 204 is formed on the other side of the isolation layer 203, which is opposite to the first electrode 202. In addition, the second electrode 204 is divided into a first portion 2041 and a second portion 2042. The first portion 2041 and the second portion 2042 are formed by ITO thin film with vertical lines patterns connected by two horizontal lines patterns. The vertical lines patterns of the first portion 2041 and the second portion 2042 are formed in parallel, and the two horizontal lines of the first portion 2041 and the second portion 2042 are opposite to each other. The spacing between the vertical lines patterns of the second portion 2042 is wider than that of the first portion 2041 so as to allow the spacing of the second portion 2042 to arrange two vertical lines patterns of the first portion 2041 with equal spacing. The configuration of the first portion 2041 and the second portion 2042 constructs as shape by an interdigitated configuration. Namely, the spacing of the second portion 2042 is wider than that of the first portion 2041. The number of the fingers and the spacings may be designed depending on practical requirement. In addition, different voltages supplied to the electrodes in accompanying with different spacings configuration may create multiple different electrical field distributions. The third electrode 208 is formed between the second glass substrate 209 and the second alignment 207, and the third electrode 208 is formed of ITO and coated on the entire surface of the second glass substrate 209.

Please refer to FIG. 2B, different voltages are supplied to the first electrode 202, the second electrode 204 and third electrode 208 to switch among the two-dimensional, three-dimensional and IP stereo image. The embodiment shows the two-dimensional display mode. The voltage providing device 400 does not offer voltage, namely zero voltage (ground), to the first electrode 202, the second electrode 204 and the third electrode 208. The arrangement of the liquid crystal molecular of the first liquid layer 206 is aligned in order to allow the two-dimensional image to directly pass through the image mode switch device 200 to display the two-dimensional image. If the three-dimensional image is displayed, the first electrode 202 is grounded by the voltage providing device 400, and the voltage providing device 400 supplies the second electrode 204 and third electrode 208 with a first voltage. In one embodiment, the first voltage is around ±1 volt ~±100 volts. If the user would like to show the IP stereo image, the voltage providing devices 400 supplies a second voltage to the first electrode 202 and the third electrode 208, and supplies a third voltage to the second portion 2042 of the second electrode 204, and the first portion 2041 of the second electrode 204 is grounded. It should be noted that the spacing of the first portion 2041 and the second portion 2042 is different. In one embodiment, the second voltage is around ±1 volt ~±100 volts; the third voltage is around ±1 volt ~±100 volts. The second voltage is different from the third voltage. It should be noted that the second voltage and the third voltage is higher than the first voltage.

Figure 4:
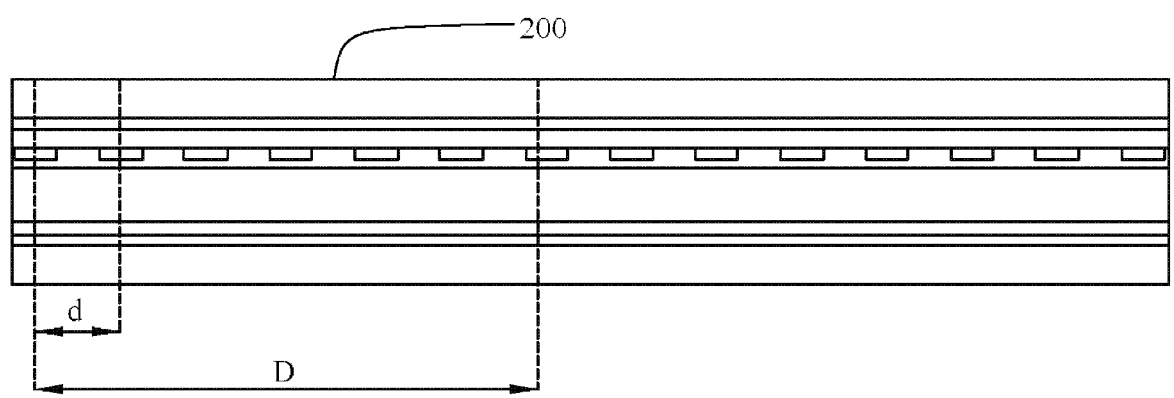
FIG. 4 illustrates the arrangement of the liquid crystal molecular for displaying 3D and IP image by supplying different voltage on the liquid crystal layer with one embodiment of the present invention.

Turning to FIG. 4 and FIG. 2B, the aforementioned different voltages are offered to the first electrode 202, the second electrode 204 and third electrode 208 of the image mode switch device 200 to arrange the liquid crystal molecular of the first liquid crystal layer 206 with a spacing d to achieve the effect of optical grating. When the IP stereo image is displayed, the spacing of the arranged liquid crystal molecular is D to achieve the fly-eye effect. The voltage providing device 400 may offer different voltages to the first electrode 202, the second electrode 204 and third electrode 208 of the image mode switch device 200 based on the different display modes to achieve the purpose of displaying two-dimensional, three-dimensional and IP stereo image. Further, the real image and the virtual image of the apparatus can be controlled based on the different voltages.

Figure 5A:
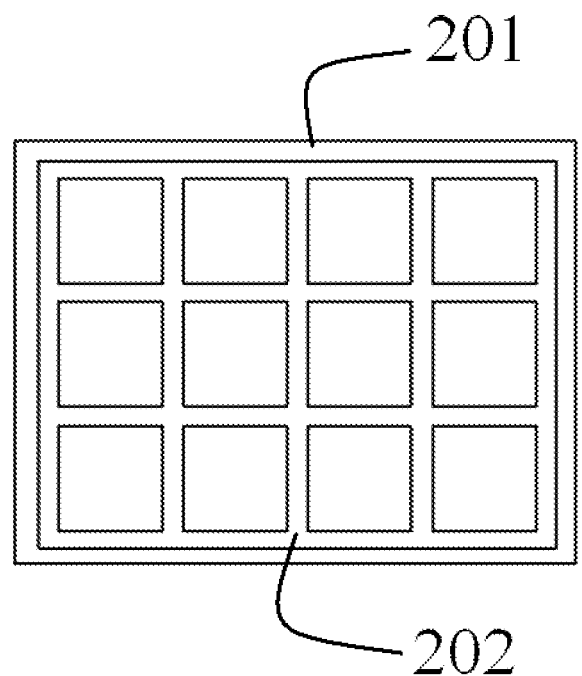
FIGS. 5A-5B illustrates further embodiments of the first and the second electrode of the present invention.
Figure 5B:
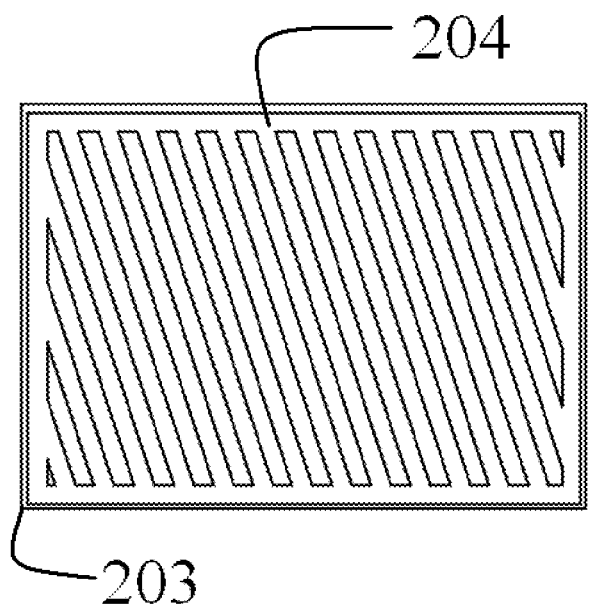

Another embodiment of the present invention is referred to FIG. 5A, and it shows the first electrode 202 structure. The first electrode 202 is formed on one side of the first glass substrate 201 with a grid pattern having pluralities of square frames. The dimension of each square frame is about 1×1 pixel to 500×500 pixels. Similarly, the first electrode 202 is formed on the first glass substrate 201, and followed by forming the isolation layer 203 on the other side of the first glass substrate 201 opposite to the first electrode 202. Thereafter, the second electrode 204 is formed as shown in FIG. 5B. The sequence of the formation can be switched. Please refer to FIG. 5B, it shows the second electrode 204 structure. The second electrode 204 is formed on the other side, which is opposite to the first electrode, of the isolation layer 203. The second electrode 204 is formed by ITO thin film with square frame. Pluralities of tilted lines patterns are constructed within the square frame. Namely, the patterns are formed with pluralities of titled lines. The third electrode 208 is formed between the second glass substrate 209 and the second alignment 207. The third electrode 208 is formed by ITO thin film which is coated on the entire surface of the second glass substrate 209.

The different electrode patterns in accompanying with the different voltage is illustrated for the first electrode 202, the second electrode 204 and the third electrode 208 to achieve the purpose of switching among the two-dimensional, the three-dimensional and the IP stereo image. In one embodiment, the first voltage is around ±1 volt ~±100 volts. When the IP stereo image is displayed, the second electrode 204 is grounded by the voltage providing device 400; and the voltage providing device 400 offers a second voltage to the first electrode 201 and the third electrode 208, and the second voltage is around ±1 volt ~±100 volts. Therefore, the present invention may allow the liquid crystal layer 206 to creates parallax or optical grating when the three-dimensional image is display; while the liquid crystal layer 206 creates fly eye lens when the IP stereo image is display. It should be noted that the second voltage is higher than the first voltage.

Therefore, the present invention may perform the display of 2D, 3D or IP stereo image by using the image mode switch device 200 to allow the user to display any type of image, and display the clear 2D, 3D or IP stereo image through the image mode switch device 200 and the display device 300.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the invention. It is intended that all such modifications and alterations are included insofar as they come within the scope of the invention as claimed or the equivalents thereof.

What is claimed is:

1. A display apparatus with display switching modes comprising:
    a display device;
    an image mode switch device formed corresponding to said display device, wherein said image mode switch device includes: a liquid crystal layer; a first electrode set on a side of said liquid crystal layer; a second electrode set between said first electrode and said liquid crystal layer; a third electrode set on another side of said liquid crystal layer; and
    a voltage providing device electrically coupled to said image mode switch device to supply different voltages to said first electrode, said second electrode and said third electrode for switching displaying modes;
    wherein said first electrode includes a first pattern, said second electrode including a second pattern having a first portion and a second portion, wherein said first portion and said second portion have different pattern spacings and are constructed by an interdigitated configuration;
    wherein said first electrode is grounded, said second electrode and said third electrode being supplied with a first voltage when said display apparatus displays a three-dimensional image.

2. The apparatus of claim 1, wherein a spacing of said second portion is wider than that of said first portion.

3. The apparatus of claim 1, wherein a spacing between two adjacent vertical lines of said second portion arranges two vertical lines with equal spacing of said first portion therebetween.

4. The apparatus of claim 1, wherein said first electrode, said second electrode and said third electrode are grounded when said display apparatus displays a two-dimensional image.

5. The apparatus of claim 1, wherein said first electrode, said second electrode and said third electrode are formed with ITO.

6. The apparatus of claim 1, wherein said first electrode, said second electrode and said third electrode are formed with IZO.

7. A display apparatus with display switching modes, comprising:
    a display device;
    an image mode switch device formed corresponding to said display device, wherein said image mode switch device includes: a liquid crystal layer; a first electrode set on a side of said liquid crystal layer; a second electrode set between said first electrode and said liquid crystal layer; a third electrode set on another side of said liquid crystal layer; and
    a voltage providing device electrically coupled to said image mode switch device to supply different voltages to said first electrode, said second electrode and said third electrode for switching displaying modes;
    wherein said first electrode includes a first pattern, said second electrode including a second pattern having a first portion and a second portion, wherein said first portion and said second portion have different pattern spacings and are constructed by an interdigitated configuration;
    wherein said first electrode and said third electrode are supplied with a second voltage, said second portion of said second electrode and said third electrode being supplied with a third voltage, and said first portion of said second electrode being grounded when said display apparatus displays a stereo image.

8. The apparatus of claim 7, wherein a spacing of said second portion is wider than that of said first portion.

9. The apparatus of claim 7, wherein a spacing between two adjacent vertical lines of said second portion arranges two vertical lines with equal spacing of said first portion therebetween.

10. The apparatus of claim 7, wherein said first electrode, said second electrode and said third electrode are grounded when said display apparatus displays a two-dimensional image.

11. The apparatus of claim 7, wherein said first electrode, said second electrode and said third electrode are formed with ITO.

12. The apparatus of claim 7, wherein said first electrode, said second electrode and said third electrode are formed with IZO.

* * * * *